UNITED STATES PATENT OFFICE.

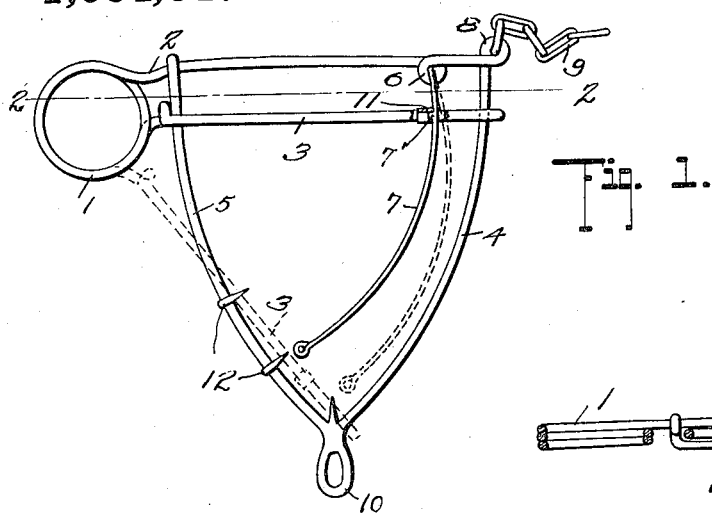
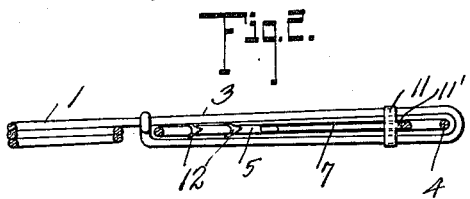
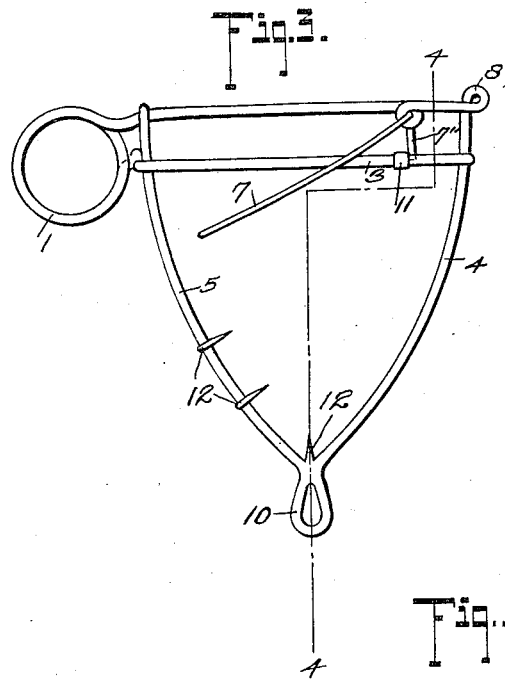
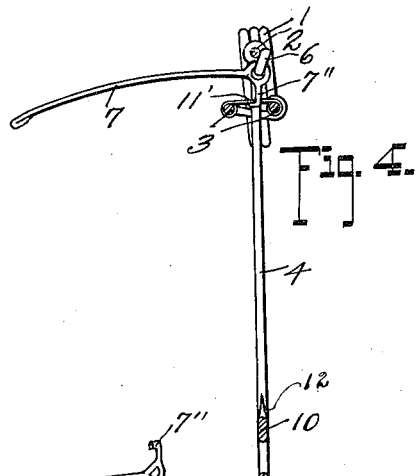
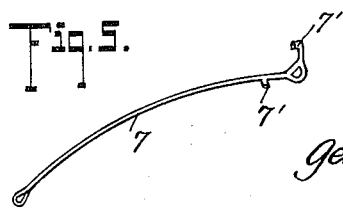

GEORGE NELSON HOFFMAN, OF WATERFORD, NEW YORK.

ANIMAL-TRAP.

1,064,647.  Specification of Letters Patent.  Patented June 10, 1913.

Application filed July 16, 1912. Serial No. 709,777.

*To all whom it may concern:*

Be it known that I, GEORGE NELSON HOFFMAN, a citizen of the United States, residing at Waterford, in the county of Saratoga and State of New York, have invented certain new and useful Improvements in Animal-Traps, of which the following is a specification.

This invention appertains to improvements in animal traps, the particular object in view being to provide a simple device constructed of spring wire and so formed as to be readily used as a "bait" trap for insnaring animals, or as a "den" trap, where it is placed in runways and similar passages, or at the entrance of their cuddies, or homes.

It is contemplated in the construction of my invention to so shape the device as to eliminate the usual disadvantages of traps of this character, such as incidental to freezing of the ground upon which it is placed, resulting in preventing operation of the trap, as well as to provide a peculiar form of trigger which will perform the dual function hereinbefore mentioned.

For a full understanding of the present invention, reference is to be had to the following description and to the accompanying drawing, in which:

Figure 1 is a view in elevation, showing the trap set for operation by contact of the animal in passing through the same. Fig. 2 is a horizontal sectional view on the line 2—2 of Fig. 1. Fig. 3 is a rear elevation showing the trigger set when the device is used as a "bait" trap. Fig. 4 is a vertical sectional view taken about on the line 4—4 of Fig. 3. Fig. 5 is a perspective view of the trigger alone.

Throughout the following detail description and on the several figures of the drawing, similar parts are referred to by like reference characters.

Specifically describing my invention and referring to the drawings, the trap constructed in accordance with my invention consists of a single piece of spring wire of any suitable size formed intermediate its length with a spiral spring 1 which may consist of any desired number of coils. One terminal of the wire, designated 2, is bent in a peculiar manner, as best shown in Figs. 1 and 3, so as to form an enlarged loop of substantially triangular shape. In practice, I have found that this particular form is best suited for the functions hereinafter to be more fully described. The other terminal of the wire is bent to form an elongated loop 3 passing around the sides 4 and 5 of the triangular loop aforesaid, the elongated loop 3 forming a spring-actuated gripping jaw. The terminal 2 is bent on the base side of the triangular loop to form a depending eye 6 in which is pivotally mounted a trigger 7. At a corner of the triangular loop, another eye 8 is formed in which may be secured a chain 9 or other fastening means for holding the trap in its position, as will be obvious to those familiar with the use of these devices. At the apex of the triangular loop, another enlarged eye 10 is formed, the latter serving as a base or foot upon which the trap stands in its vertical position. The object of the provision of this eye 10 is to keep the trap proper off of the ground so that when the latter is frozen the operation of the trap will not be prevented, as is generally the case with traps of a similar character heretofore constructed.

Arranged transversely of the elongated loop or gripping jaw 3 is a trigger bar 11, suitably secured to the sides of the jaw beneath the pivotal point of the trigger 7 when the latter is in its set position. This plate or bar 11 is of a suitable non-rusting material, such as brass, or the like, it being essential in traps of this nature to provide against likelihood of rusting of the parts so as to insure the operation of the sensitive trigger hereinbefore mentioned.

As previously specified, the trap is designed for use particularly as a "den" trap, and as such the trigger is adapted to be disposed or set in the same plane as the sides 4 and 5 of the enlarged triangular loop. The position just mentioned is best shown in Fig. 1 of the drawings, and it will be noted that the trigger plate 11 is provided with a lateral projection 11' beneath which the projection 7' formed on the trigger 7 is adapted to be engaged. The body of the animal in passing through the trap contacts with the trigger 7 disposed between the sides 4 and 5, and as will be obvious, a very slight pressure against the trigger will disengage the same and permit the gripping jaw to move downwardly and thereby clutch the animal between said jaw and the side 5 upon which are preferably provided a suitable number of barbs or spikes 12 for impaling the animal in its trapped position.

Under certain conditions, it may be desired to insnare the animal by use of bait, and under such circumstances, depending, of course, upon the nature of the animal and the location of the trap, said bait is adapted to be secured to the free end of the trigger 7, which is provided with a hooked extension 7″ near its pivotal point. The extension 7″ is engaged beneath the projection 11′ of the trigger plate 11, thereby holding the trigger at substantially right angles to the triangular loop of the terminal 2, the bait being thus held away from the trap, as shown best in Fig. 4 of the drawing. To reach the bait, the animal passes through the loop and touching the trigger 7 disengages the hooked extension 7″ from the trigger plate 11, permitting the spring actuated jaw 3 to grip the animal as above described with reference to its other position.

I have also found in practice that the particular point of attachment of the chain 9 serves an important function in that any struggle on the part of the animal tends to throw it off its feet and any likelihood of freeing itself is necessarily prevented, even though no barbs are employed in its construction. That is to say, when the animal has sprung the trap, the jaw 3 clamps its body in the lower portion of the enlarged loop, and struggles on the part of the animal to release itself thereafter tend to move the trap circularly with the attaching eye 8 as a center, thereby throwing the animal off its feet. It will also be noted by reference to Fig. 1 that the foot or eye 10 limits the downward movement of the gripping jaw 3.

The trap constructed as above described may be made very cheaply from a manufacturing standpoint, and is particularly effective, not requiring any very strong spring material, as is usually necessary in devices of this nature, in order to prevent likelihood of escape of the animal when once the trap has been sprung.

Having thus described the invention, what is claimed as new is:

1. An animal trap consisting of a spring, one terminal thereof being formed into an enlarged loop and the other terminal constituting a gripping jaw, a trigger carried by the loop terminal, and coöperating means adapted to engage with the gripping jaw when said trigger is disposed in the same plane as the loop aforesaid to hold the jaw set, and also adapted to engage said gripping jaw when the trigger is disposed at an angle out of the plane of the loop.

2. An animal trap comprising a spring, one terminal being formed into an enlarged loop and the other terminal constituting a gripping jaw, a trigger, means formed on the trigger to coöperate with the jaw when the former is in the same plane as the loop and also when out of the plane of the loop, and means carried by the jaw for holding the trigger set in either of the positions aforesaid.

3. An animal trap consisting of a spring, one terminal being formed into an enlarged loop, and the other terminal constituting a gripping jaw, a trigger having a projection for engaging the said jaw when in the same plane as the enlarged loop, and an extension for engagement with the jaw when placed at substantially right angles to said jaw.

4. An animal trap comprising a spring, one terminal being formed into an enlarged loop of substantially triangular shape and the other terminal being bent around said loop to form a gripping jaw, a trigger pivotally carried by the loop aforesaid, coöperating means engaging with the jaw when the former is in the plane of the loop, and also adapted to engage with the jaw when out of the plane of the loop, and means formed on the loop for limiting the movement of the gripping jaw when the latter has been released from the trigger.

5. An animal trap consisting of a single piece of wire formed intermediate its ends with a spiral spring, one terminal of the wire being bent to form a vertical loop of substantially triangular shape, said loop having an eye to serve as a base for the trap, and the other terminal of the wire being bent to form an elongated loop to serve as a gripping jaw, a plate arranged transversely of the elongated loop and secured thereto, and a trigger pivotally mounted upon the vertical loop and having a projection for engagement with the plate aforesaid when the trigger is in the same plane as the vertical loop and an extension adapted to be engaged with the plate when the trigger is disposed at substantially right angles to said last-mentioned loop.

6. An animal trap consisting of a single piece of wire formed intermediate its ends with a spiral spring, one terminal of the wire being bent to form a vertical loop of substantially triangular shape, said loop having an eye to serve as a base for the trap, one side of the loop being also formed intermediate its length with a second eye, and the other terminal of the wire being bent to form an elongated loop through which the vertical loop aforesaid passes, said elongated loop constituting a gripping jaw, a trigger plate secured to the elongated loop, a trigger pivotally mounted in the second eye of the vertical loop aforesaid and having a projection adapted to be engaged with the plate aforesaid when the trigger is in the same plane as the vertical loop, and also having a hooked extension adapted to be engaged with the plate when the trigger is disposed at substantially right angles to said vertical loop.

In testimony whereof I affix my signature in presence of two witnesses.

GEORGE NELSON HOFFMAN.

Witnesses:
H. R. VAN KLEECK,
JOHN ENNELLO.

Copies of this patent may be obtained for five cents each, by addressing the "Commissioner of Patents, Washington, D. C."